United States Patent
Urmenyi

[15] 3,651,398
[45] Mar. 21, 1972

[54] METHOD OF AND DEVICE FOR CONTINUOUSLY MEASURING THE THICKNESS OF ELECTRICALLY CONDUCTIVE MOVING SHEET MATERIAL AND COMPENSATING SAID MEASUREMENT FOR SHEET TEMPERATURE

[72] Inventor: Laszlo Urmenyi, 18 Ernle Road, London, S. W. 20, England

[22] Filed: Aug. 19, 1968

[21] Appl. No.: 753,796

[52] U.S. Cl. ........................................................324/40
[51] Int. Cl. .....................................................G01r 33/12
[58] Field of Search ..............................................324/34, 40

[56] References Cited

UNITED STATES PATENTS

| | | | |
|---|---|---|---|
| 2,020,067 | 11/1935 | Keinath | 324/34 TE |
| 2,057,835 | 10/1936 | Karajan et al. | 324/40 |
| 2,189,092 | 2/1940 | Urmenyi | 324/40 |
| 2,603,001 | 7/1952 | Fox et al. | 324/34 TE |

FOREIGN PATENTS OR APPLICATIONS 538,988   8/1941   Great Britain ........................324/34 TE Primary Examiner—Rudolph V. Rolinec
Assistant Examiner—R. J. Corcoran

[57] ABSTRACT

The invention refers to a method of and device for continuously measuring the thickness of electrically conductive moving sheet material consisting in providing an eddy current type thickness gauge which is affected by the thickness and temperature of the sheet material, a rotatably mounted tubular metallic body of essentially cylindrical shape which is longer than the width of the sheet material and is in contact with the whole width of the sheet material whereby the sheet material and the metallic body both acquire the same temperature, electrical means are provided to sense the temperature of the metallic body giving an electrical signal and means are provided to apply said signal to the eddy current gauge to compensate automatically for the effect of temperature variations of the sheet material on the thickness measurement. In one example of the invention the electrical means to sense the temperature of the metallic body consists of two coils of which the primary carries alternating current, a disc shaped body which is in thermal contact with said metallic body is positioned between the two coils and the secondary voltage is thus a function of the temperature of the metallic body. Since this latter means is identical with the means used in the eddy current gauge for thickness measurement, the said secondary voltage follows the same law as far as temperature dependence is concerned as the eddy current gauge and therefore the temperature compensation is exactly correct over the whole temperature range.

6 Claims, 6 Drawing Figures

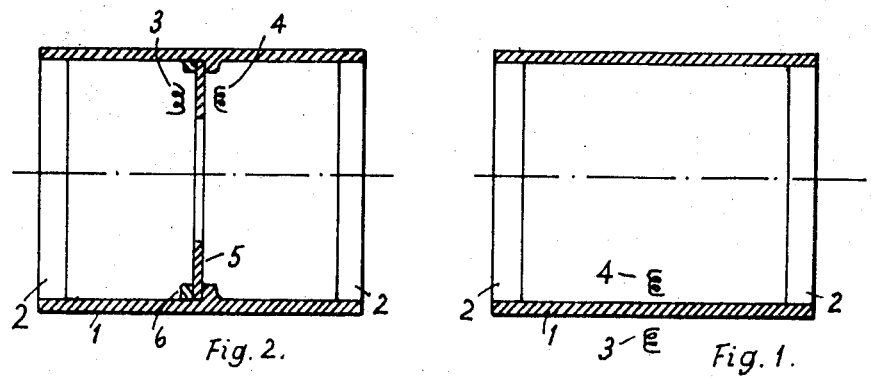
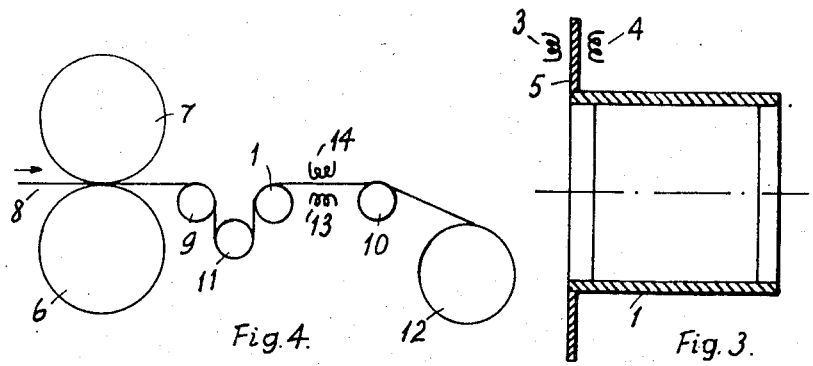
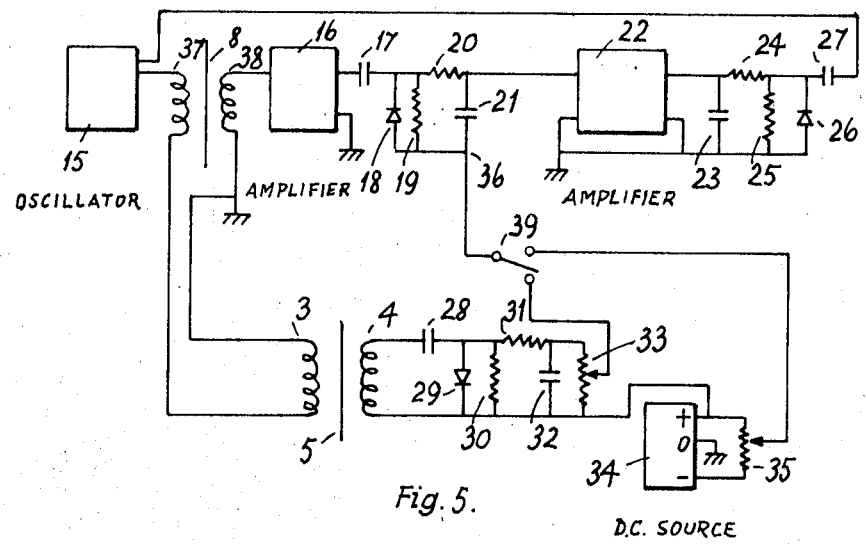

METHOD OF AND DEVICE FOR CONTINUOUSLY MEASURING THE THICKNESS OF ELECTRICALLY CONDUCTIVE MOVING SHEET MATERIAL AND COMPENSATING SAID MEASUREMENT FOR SHEET TEMPERATURE

Known eddy current type thickness gauges for continuously measuring the thickness of moving metal foils and other sheet material have the disadvantage that changes in the temperature of the sheet material to be measured affect the indication of the gauges. The purpose of the present invention is to eliminate the effect of temperature variations on the measurement.

The method according to the invention consists in bringing a rotatably mounted metallic body of essentially cylindrical shape in contact with the moving sheet material whereby a heat exchange takes place between the metallic body and the sheet material resulting in the sheet material and the metallic body both acquiring essentially the same temperature, obtaining an electric quantity which is a function of the temperature of said metallic body and said electric quantity is applied to the circuit of an eddy current type thickness gauge to compensate for changes in indications of said eddy current gauge caused by variations of temperature of the sheet materials.

The device according to the invention consists of an eddy current thickness gauge adapted to provide a first electrical quantity which is a function of the thickness and temperature of the sheet material to be measured, a rotatably mounted metallic body of essentially cylindrical shape adapted for mounting in such position that it is in contact with the sheet material to be measured so that a heat exchange takes place between the metallic body and the sheet material, means for providing a second electrical quantity which is a function of the temperature of said metallic body and means to apply said second electrical quantity to said eddy current thickness gauge whereby the variations of said second electrical quantity due to changes in temperature of the sheet material compensate for changes in indications of said eddy current gauge caused by said temperature variations.

The invention will now be more fully described by the way of examples with reference to the drawings. In the drawings:

FIG. 1 shows an example of a rotatable tube in which the tube wall itself is utilized as the part positioned in the magnetic field of the primary coil.

FIG. 2 shows another example of a rotatable tube in which a disc is utilized as the part positioned in the magnetic field of the primary coil.

FIG. 3 shows a rotatable tube with a disc attached as the part positioned in the magnetic field of the primary coil.

FIG. 4 shows an example of installation of a rotatable tube on a rolling mill.

FIG. 5 shows a simplified circuit diagram of an eddy current thickness gauge including the circuit of the temperature compensation.

Figure 6:
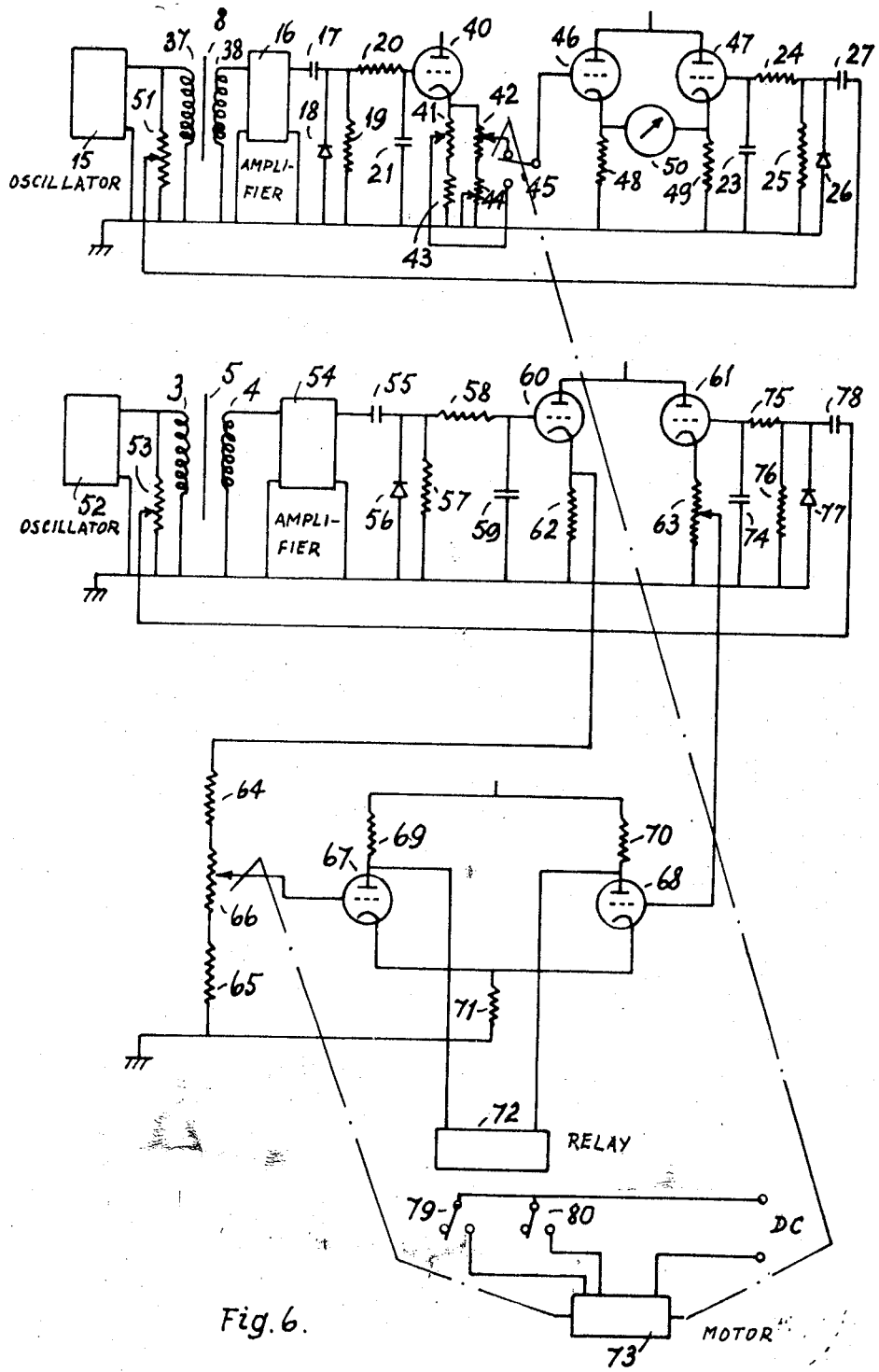
FIG. 6 shows another example of a circuit diagram of temperature compensation.

In one example of the method according to the invention, one metal part attached to or forming part of said metallic body is subjected to an alternating magnetic field produced by a primary coil carrying alternating current whereby eddy currents are induced in said part the intensity of said eddy currents being a function of the temperature of said part, a secondary coil being placed opposite said primary coil in such relative position that the magnetic field of the primary coil at least partially passes through the secondary coil and said part is positioned between the primary coil and secondary coil, the magnetic field of said eddy currents being essentially opposed to the magnetic field of the primary coil, the secondary voltage induced in the secondary coil being a function of the temperature of said part and the secondary voltage is applied to the circuit of an eddy current thickness gauge in such a way that the variations of said secondary voltage due to changes in temperature of the sheet material compensate for changes in indication of said eddy current gauge caused by said temperature variations.

The device according to the above example of the invention consists of a rotatably mounted metallic body of essentially cylindrical shape adapted for mounting in such position that it is in contact with the sheet material to be measured so that a heat exchange takes place between the metallic body and the sheet material, a pair of coils inductively coupled of which the primary carries alternating current, a metal part attached to said metallic body, said part being positioned between the primary and secondary of said coils in the magnetic field of the primary coil, whereby eddy currents are induced in said part, the intensity of the eddy currents being a function of the temperature of said part, the voltage induced in the secondary coil being reduced by the magnetic flux of said eddy currents, so that the secondary voltage becomes a function of the temperature of said part and means are provided to apply said varying secondary voltage to an eddy current sheet thickness measuring device in such a way that the effect of sheet temperature variations on the indications of the thickness measuring device are compensated.

Referring now to FIG. 1, 1 is a tube, 2 are ball races, 3 is a primary coil, 4 is a secondary coil. The tube is rotatably mounted near the moving foil in such position that it is in contact with the foil which forces the tube to rotate whereby the tube takes up the temperature of the foil.

Coil 3 carries alternating current producing an alternating magnetic field, which in turn induces eddy currents in the tube wall. The voltage induced in coil 4 is reduced by the effect of the eddy currents. Since the intensity of the eddy currents is a function of the tube temperature, the secondary voltage is also a function of tube temperature. The hotter is the tube, the greater is the amplitude of the secondary voltage.

In FIG. 2, 1 is a tube, 2 are ball races, 3 is a primary coil, 4 is a secondary coil, 5 is a disc, 6 is a ring for holding disc 5 in position. Disc 5 is in good thermal contact with tube 1 so that the temperature of tube 1 is quickly taken up by disc 5.

The function of coils 3 and 4 is the same as in FIG. 1. While in FIG. 1 coils 3 and 4 must be stationary, otherwise they would interfere with the moving foil contacting tube 1, in FIG. 2 coils 3 and 4 may be stationary or may be fixed to the inside of tube 1 and rotating with it. If the coils are rotating, slip rings must be provided for the electrical connections to the coils. To avoid this, stationary coils are preferable.

In FIG. 3, 1 is a rotatable tube, which could also be a solid bar, 3 and 4 are the primary and secondary coils respectively, 5 is a disc positioned between coils 3 and 4.

The rotatable body may be short relative to the width of the moving sheet material, in which case contact between the rotatable body and the sheet material is restricted to a narrow band on the surface of the rotatable body parallel to its axis. If the rotatable body is made longer than the width of the moving sheet material, then a wrap of the sheet material round the rotatable body of the order of 90° or even more is possible, whereby a quick exchange of heat and equalization of temperature between the sheet material and the rotatable body is obtained.

The latter case is illustrated in FIG. 4. 1 is the rotatable body, 6 and 7 are the rolls of a rolling mill, 8 is the sheet material processed in the mill, 9 and 10 and 11 are idler rolls, 12 is the finished material coiled up, 13 and 14 are the measuring heads of the thickness gauge. The material moves in the direction of the arrow. This arrangement allows a constant wrap of approximately 90° round the rotatable body 1.

In FIG. 5, 15 is an oscillator, 37 and 38 are the coils in the measuring heads of the thickness gauge, 8 is the sheet material to be gauged, 16 is an amplifier, 17 is a capacitor, 18 is a diode, 19 and 20 are resistors, 21 is a capacitor, 22 is a differential amplifier comparing the variable voltage obtained from the measuring head of the thickness gauge with a constant comparison voltage, 23 is a capacitor, 24 and 25 are resistors, 26 is a diode, 27 is a capacitor, 3 is the primary coil, 4 is the secondary coil, 5 is the part positioned between coils 3 and 4, 28 is a capacitor, 29 is a diode, 30 and 31 are resistors, 32 is a capacitor, 33 is a potentiometer, 34 is a stabilized source of direct voltage, which is variable by means not shown, 35 is a potentiometer, 36 is the point in the circuit of the thickness gauge where the temperature compensation, which is the subject of the present invention, is applied. Without temperature compensation, point 36 would be connected to ground. 39 is a change over switch.

In operation, the voltage across coil 38 depends on the thickness and on the electrical resistivity of the sheet material 8. Since the electrical resistivity increases with increasing temperature, the voltage across coil 38 and therefore across capacitor 21 depends on the temperature of sheet material 8 and increases with increasing temperature. Since the thickness of part 5 does not change, the voltage across coil 4 and consequently across capacitor 32 changes only with the temperature of part 5. Part of the voltage across capacitor 32, taken from potentiometer 33, is connected in series opposition to the voltage across capacitor 21. In order to bring the potential at point 36 back to near ground potential, the stabilized adjustable voltage of source 34 is connected in series opposition to the voltage taken from potentiometer 33.

When switch 39 is switched to potentiometer 35, then the temperature compensation is out of action. This switch position is selected, when it is required to switch off the temperature compensation and also when a sample foil of known nominal thickness is used for setting the thickness gauge. The sample foil is usually at room temperature. The setting of potentiometer 35 depends on the temperature of the sample foil and can be provided with a temperature scale for easy setting.

For automatic temperature compensation, switch 39 is switched to potentiometer 33. As the temperature of the foil 8 e.g., rises, the voltage across capacitor 21 also rises, assuming constant foil thickness. But the temperature of part 5 also rises to the same value as foil 8, the voltage across capacitor 32 rises and since the two voltages are connected in series opposition, at a certain setting of potentiometer 33 the voltage between the upper plate of capacitor 21 and ground remains constant and therefore the temperature influence is compensated.

In the example of FIG. 6, 15 is an oscillator, 37 and 38 are the coils in the measuring heads of the thickness gauge, 8 is the sheet material, 16 is an amplifier, 17 is a capacitor, 18 is a diode, 19 and 20 are resistors, 21 is a capacitor, 40 is a vacuum tube connected as a cathode follower, 41 and 42 are potentiometers, 43 is a resistor, 44 is a variable resistor, 45 is a changeover switch, 46 and 47 are vacuum tubes, 48 and 49 are resistors, 50 is a center zero galvanometer, 23 is a capacitor, 24 and 25 are resistors, 26 is a diode, 27 is a capacitor, 51 is a potentiometer, 52 is an oscillator, 3 and 4 are the primary and secondary coils respectively of the temperature compensating circuit, 5 is the part positioned between coils 3 and 4, 53 is a potentiometer, 54 is an amplifier, 55 is a capacitor, 56 is a diode, 57 and 58 are resistors, 59 is a capacitor, 60 and 61 are vacuum tubes, 62 is a resistor, 63 is a potentiometer, 74 is a capacitor, 75 and 76 are resistors, 77 is a diode, 78 is a capacitor, 64 and 65 are resistors, 66 is a potentiometer, 67 and 68 are vacuum tubes, 69, 70 and 71 are resistors, 72 is a sensitive center zero moving coil relay with two slave relays or alternatively a sensitive solid state switching device operating two slave relays. Such devices are well known in the art and are arranged in such a way that when the current flows in one direction through 72, one of the slave relays is energized and when the current flows through 72 in the opposite direction, the other one of the slave relays is energized. 73 is a reversible motor which may be a DC motor as indicated in the drawing or a reversible AC motor. Potentiometers 42 and 66 are ganged and are driven simultaneously by motor 73. 79 and 80 are contacts operated by the two slave relays respectively.

The upper half of the circuit diagram shows a simplified diagram of an eddy current type foil gauge with the addition of a cathode follower 40 with two parallel potentiometers in the cathode circuit. The operation of the foil gauge is the same as described with reference to FIG. 5. The differential amplifier 22 of FIG. 5 takes here the form of two vacuum tubes 46 and 47 with cathode resistors 48 and 49 and center zero meter 50. Amplifier 16 contains adjustable means not shown whereby the voltage across capacitor 21 can be adjusted to such value that the meter 50 reads zero when the foil thickness is correct. The setting can be carried out by introducing a sample foil of correct thickness between coils 37 and 38 and switching switch 45 to potentiometer 41. The temperature of the sample foil is room temperature. Potentiometer 41 is provided with a temperature scale and is set to room temperature The lower half of the circuit diagram provides the temperature compensation. Its function is similar to the foil gauge. In this example a separate oscillator 52 is used to energize coil 3 which could be energized instead by oscillator 15 as in the previous example. In some applications means are provided to change the frequency of oscillator 15 and in such cases a separate oscillator for feeding coil 3 is preferable. Since part 5 has a constant thickness, the voltage across coil 4 and consequently across resistor 62 depends only on the temperature of part 5. At one definite voltage Vs at the grid of vacuum tube 67, which is approximately equal to the voltage of the grid of vacuum tube 68, there is no current flowing through 72 and consequently motor 73 is stationary. If now the temperature of 5 changes, the voltage at the grid of vacuum tube 67 changes and motor 73 starts running, moving the wiper of potentiometer 66 until the voltage at the grid 67 reaches again the value Vs when the motor 73 stops. Since potentiometers 66 and 42 are moved simultaneously by motor 73, the position of the wipers of potentiometers 66 and 42 is a function of the temperature of part 5 which is equal to the temperature of the foil or sheet material 8. By suitable choice of the values of 44, 64 and 65 it can be arranged that the wiper of potentiometer 42 acquires at any foil temperature such position that the influence of foil temperature on the thickness measurement is exactly compensated.

The temperature of the rotatable body is measured in the above examples by inducing eddy currents in part of the rotatable body. This is convenient, since the temperature measurement is instantaneous, without direct contact with the rotatable body and is not dependent on the radiation characteristics of the body. It must be emphasized however, that any other method of electrical temperature measurement may be applied without departing from the invention, e.g., resistance thermometers, thermocouples, radiation thermometers. In the latter case parts 3 to 5 and 28 to 33 in FIG. 5 would be replaced by any type of electrical temperature measuring device having an output of a direct voltage, which would be connected between the lower contact of switch 39 and voltage source 34. If a radiation thermometer is used, the heat radiation of any part of the surface of the cylindrical metallic body may be observed inside or outside, and the observed position of the surface is preferably treated by matt paint or other surface treatment to obtain a high and constant emissivity.

Other alterations may be made to the above examples without departing from the invention. Part 5 in the drawings may have any other suitable shape, being a volume of revolution, e.g., it may be a short tube of smaller diameter than tube 1 and mounted so that it is concentric with tube 1, a ring shaped component, which is shorter than tube 5, connecting tube 5 to tube 1. Coils 3 and 4 would then be mounted so that one coil is inside tube 5 and the other between tube 5 and tube 1. The circuit diagram of FIGS. 5 and 6 are only two of many possible circuits is applying compensation by utilizing the temperature dependent voltage across coil 4. E.G., the amplifier 16 in FIG. 6 may contain a variable mµ vacuum tube, diode 56 may be reversed to obtain a negative voltage across capacitor 59 which, possibly connected in series opposition with a constant DC source, may be applied at least as part of the grid bias to the variable mµ vacuum tube. In this latter case vacuum tubes 60, 61, 67 and 68 and associated components, including motor 73, would be omitted. The vacuum tube circuits of FIGS. 5 and 6 may be replaced by corresponding circuits using solid state devices in a manner well known in the art.

The material of which part 5 is made is not critical as long as the temperature coefficient of resistivity is not too small relative to the temperature coefficient of the sheet material to be measured. If only one material is to be gauged, e.g., aluminum foil, it is preferable to make part 5 of the same material.

What I claim is:

1. A method of continuously measuring the thickness of electrically conductive moving sheet material consisting in bringing a rotatably mounted tubular metallic body of essentially cylindrical shape which is longer than the width of the sheet material in contact with the whole width of the moving sheet material whereby a heat exchange takes place between the metallic body and the sheet material resulting in the sheet material and the metallic body both acquiring essentially the same temperature, obtaining an electric quantity which is a function of the temperature of said metallic body and said electric quantity is applied to the circuit of a noncontacting eddy current type thickness gauge which is used to measure continuously the thickness of said moving sheet material to compensate for changes in indications of said gauge caused by variations of temperature of the sheet material.

2. A method as claimed in claim 1 in which a metal part of essentially disc shape attached to said metallic body and rotating with the metallic body is subjected to an alternating magnetic field produced by a primary coil carrying alternating current whereby eddy currents are induced in said part the intensity of said eddy currents being a function of the temperature of said part, a secondary coil being placed opposite said primary coil in such relative position that the magnetic field of the primary coil at least partially passes through the secondary coil and said part is positioned between the primary coil and secondary coil, the magnetic field of said eddy currents being essentially opposed to the magnetic field of the primary coil, the secondary voltage induced in the secondary coil being a function of the temperature of said part and the secondary voltage is applied in such a way to the circuit of said eddy current thickness gauge, that the variations of said secondary voltage due to changes in temperature of said metal part, which follow the same law as variations in the thickness measurement of said eddy current thickness gauge due to changes in temperature of the sheet material, compensate for changes in indication of said eddy current gauge caused by said temperature variations of the sheet material.

3. A device for continuously measuring the thickness of electrically conductive moving sheet material consisting of a noncontacting eddy current thickness gauge adapted to provide a first electrical quantity which is a function of the thickness and temperature of the sheet material to be measured, a tubular metallic body of essentially cylindrical shape which is longer than the width of the sheet material to be measured adapted for rotatably mounting in such position that it is in contact with the whole width of the sheet material so that a heat exchange takes place between the metallic body and the sheet material resulting in the sheet material and the metallic body both acquiring essentially the same temperature, means for providing a second electrical quantity which is a function of the temperature of said metallic body and means to apply said second electrical quantity to said eddy current thickness gauge whereby the variations of said second electrical quantity due to changes in temperature of the sheet material compensate for changes in indications of said eddy current gauge caused by said temperature variations.

4. A device as claimed in claim 3 in which said means for providing a second electrical quantity comprises a part which is disc shaped and is attached to said metallic body in such a way that a thermal contact is obtained between said part and said metallic body whereby said part takes up the temperature of said metallic body, a pair of coils of which one is a primary and the other is a secondary coil, the primary coil being adapted to be energized with alternating current, said part being positioned between said primary and secondary coil whereby the secondary voltage induced in said secondary coil is a function of the temperature of said metallic body, said function following the same mathematical law as the said eddy current gauge.

5. Device as claimed in claim 3 in which the said first electrical quantity is a direct voltage and the second electrical quantity is also a direct voltage, said means to apply said second electrical quantity consisting of connecting means to connect said second electrical quantity in series opposition to said first electrical quantity comprising also a source of constant direct voltage connected in series with said direct voltages whereby the series connection of said three direct voltages results in a direct voltage which is a function of the thickness of the sheet material but is independent from its temperature.

6. Device as claimed in claim 4 in which said means for providing a second electrical quantity comprises also amplifying and rectifying means adapted to amplify and rectify said secondary voltage thus providing a controlling direct voltage which is a function of the temperature of said metallic body, comprising further a self balancing potentiometer the latter consisting of a reversible motor and a potentiometer driven by said motor, switching means adapted to switch on and off the reversible motor, means to apply said controlling direct voltage to said switching means, means to apply at least partially said controlling direct voltage across said potentiometer so that the balance position of said potentiometer is a function of the temperature of said metallic body, comprising also a further potentiometer connected into the circuit of and adapted to affect the indication of said eddy current thickness gauge said further potentiometer being also driven simultaneously by said motor.

* * * * *